United States Patent [19]

Reynolds

[11] Patent Number: 4,716,267

[45] Date of Patent: Dec. 29, 1987

[54] THREE PHASE HIGH FREQUENCY SPIKE WELDING SYSTEM

[75] Inventor: Roger G. Reynolds, Pontiac, Mich.

[73] Assignee: Weldex, Inc., Warren, Mich.

[21] Appl. No.: 751,334

[22] Filed: Jul. 2, 1985

Related U.S. Application Data

[63] Continuation-in-part of Ser. No. 582,326, Feb. 22, 1984, abandoned.

[51] Int. Cl.$^4$ .............................................. B23K 11/26
[52] U.S. Cl. .................................... 219/113; 219/114; 219/117.1
[58] Field of Search ............... 219/113, 114, 110, 109, 219/108, 117.1

[56] References Cited

U.S. PATENT DOCUMENTS

| | | | |
|---|---|---|---|
| 2,508,115 | 5/1950 | Klemperer | 219/113 |
| 3,074,009 | 1/1963 | Dunnabeck et al. | 219/114 |
| 3,075,094 | 1/1963 | Rockafellow | 219/114 |
| 3,143,698 | 8/1964 | Rockafellow | 219/114 |
| 4,289,948 | 9/1981 | Jurek et al. | 219/114 |
| 4,301,351 | 11/1981 | Mathews | 219/110 |
| 4,493,040 | 1/1985 | Vanderhelst | 219/110 |

Primary Examiner—Clifford C. Shaw
Attorney, Agent, or Firm—Cullen, Sloman, Cantor, Grauer, Scott & Rutherford

[57] ABSTRACT

A resistance-type welder employing a three phase, pulsed power supply and a pair of opposed electrodes which a workpiece may be clamped under pressure, includes a microcomputer based control system for allowing precise selection and control of welding sequences such as the duration during which the workpiece is clamped, the duration during which current is supplied to the electrodes and the duration during which the workpiece remains clamped between the electrodes after current flow is terminated. A plurality of switchable input devices allows data corresponding to a plurality of process variables to be input to a random access memory. A central processor enabled by a manually operable control switch produces control signals for operating a control and firing circuit in accordance with programmed instructions and the data stored in the random access memory in order to control each step in a welding cycle for precise time periods. A sensing circuit detects the level of power supply line voltage and inhibits operation of the central processor when the line voltage falls below a prescribed level. Opto-electrical switches connected to the input devices isolate sensitive logic circuits from spurious input signals. The control circuit also selectively operates a solenoid controlled, hydraulic cylinder for causing the electrodes to clamp the workpiece therebetween.

3 Claims, 21 Drawing Figures

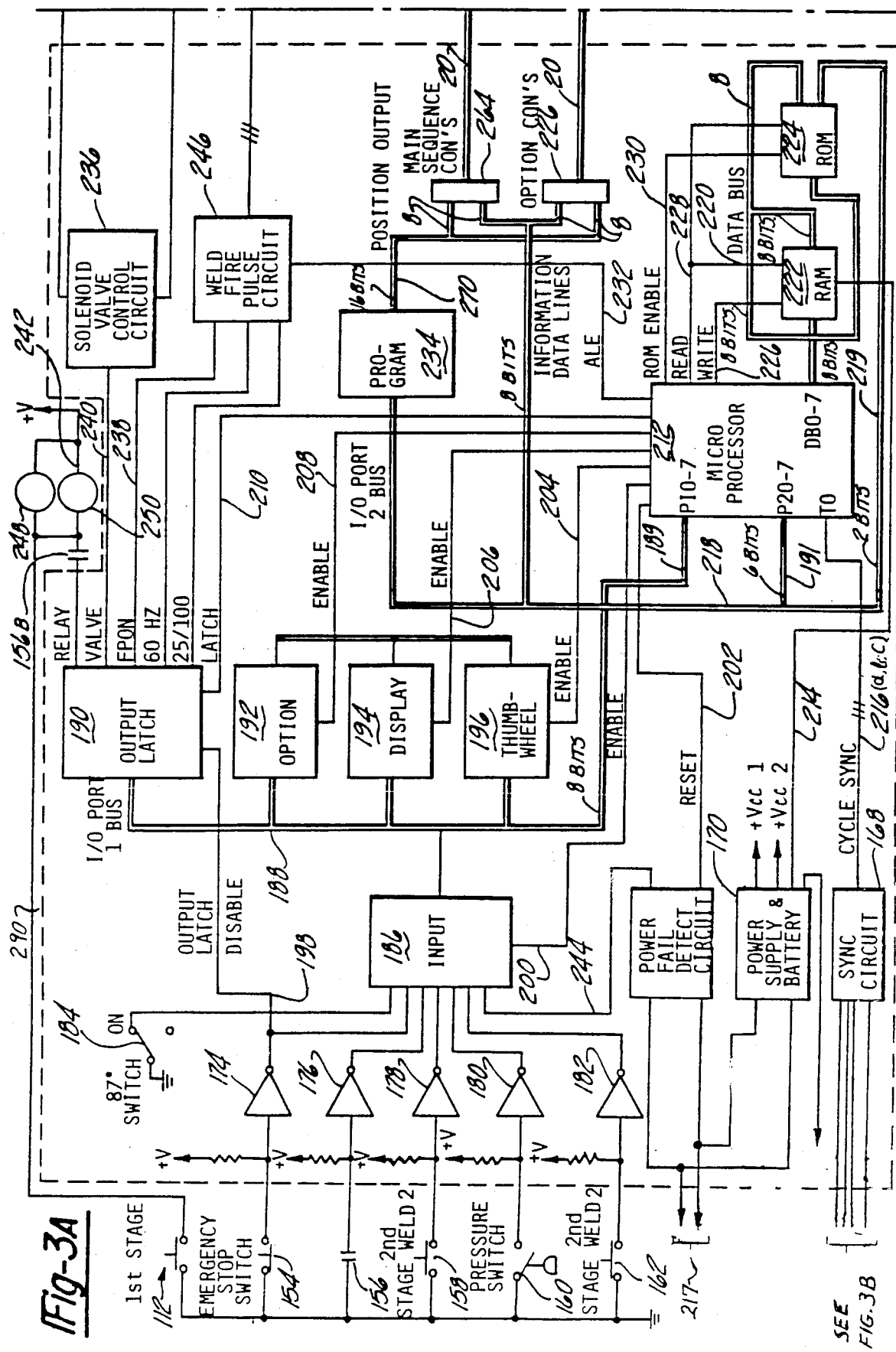

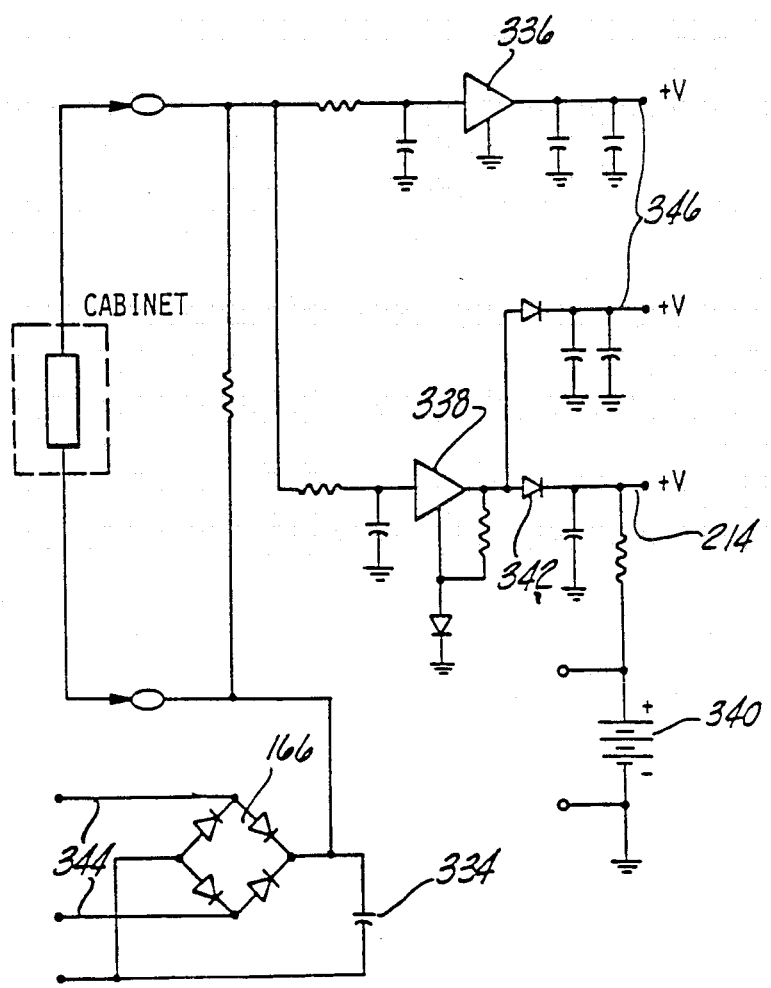

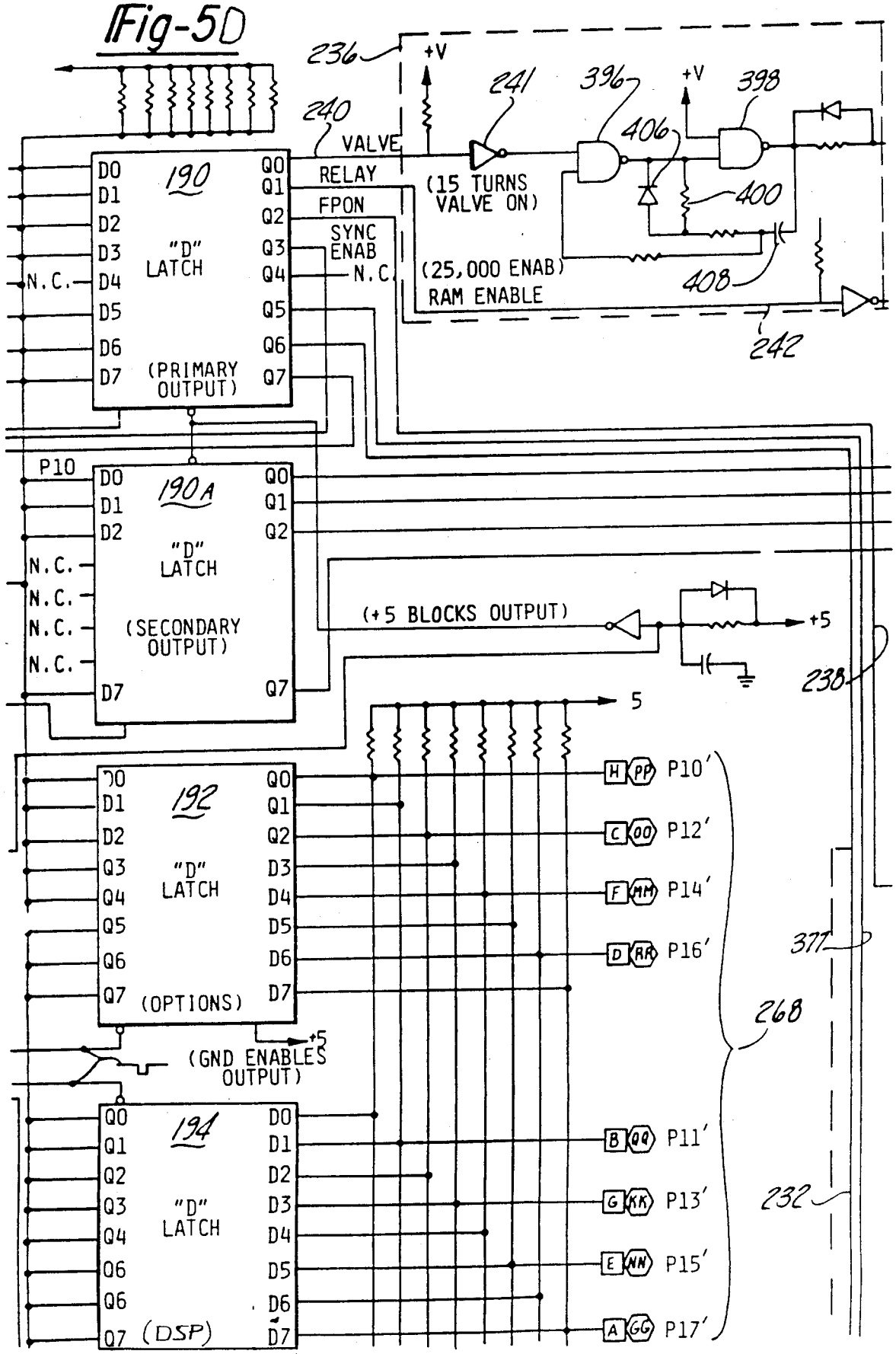

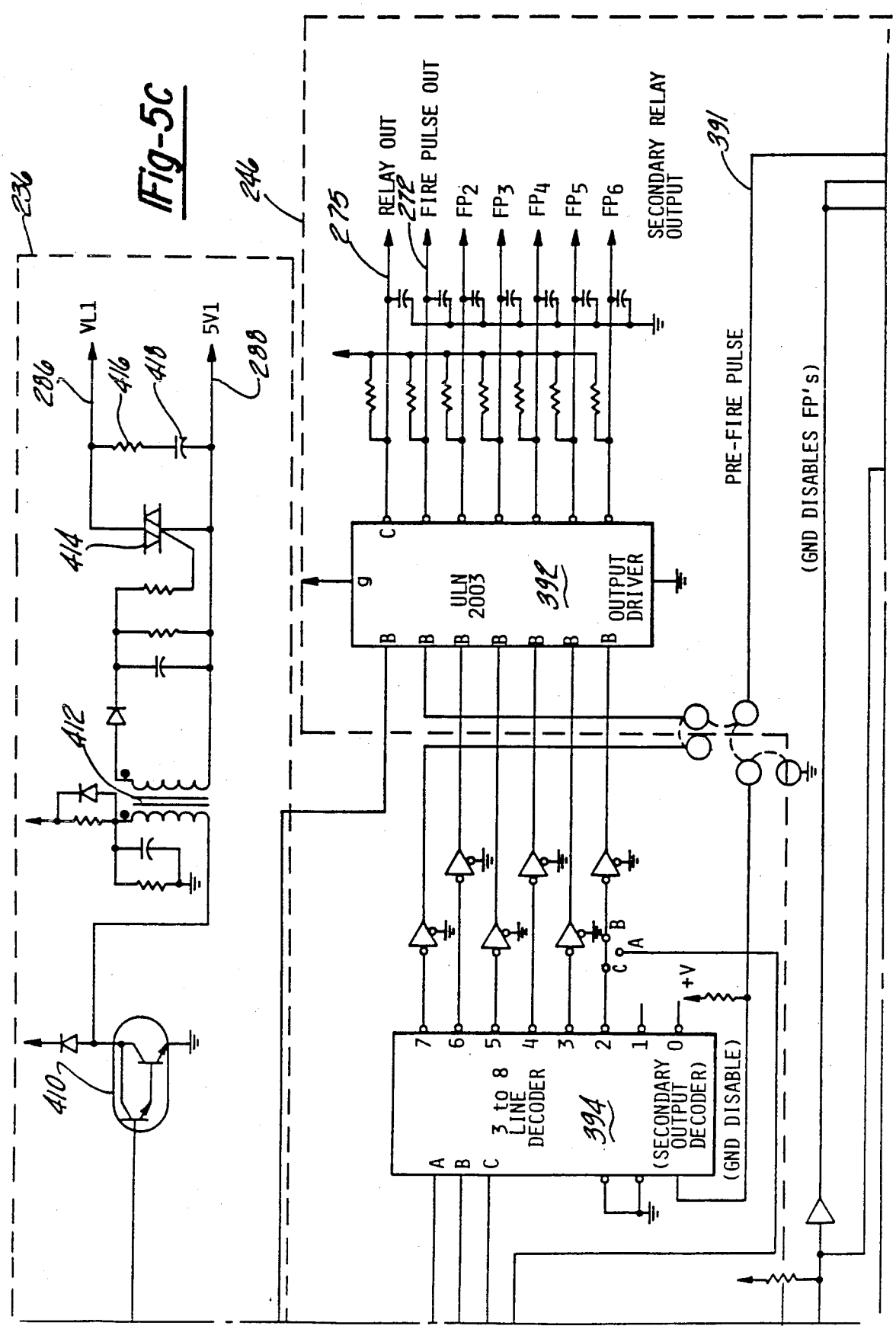

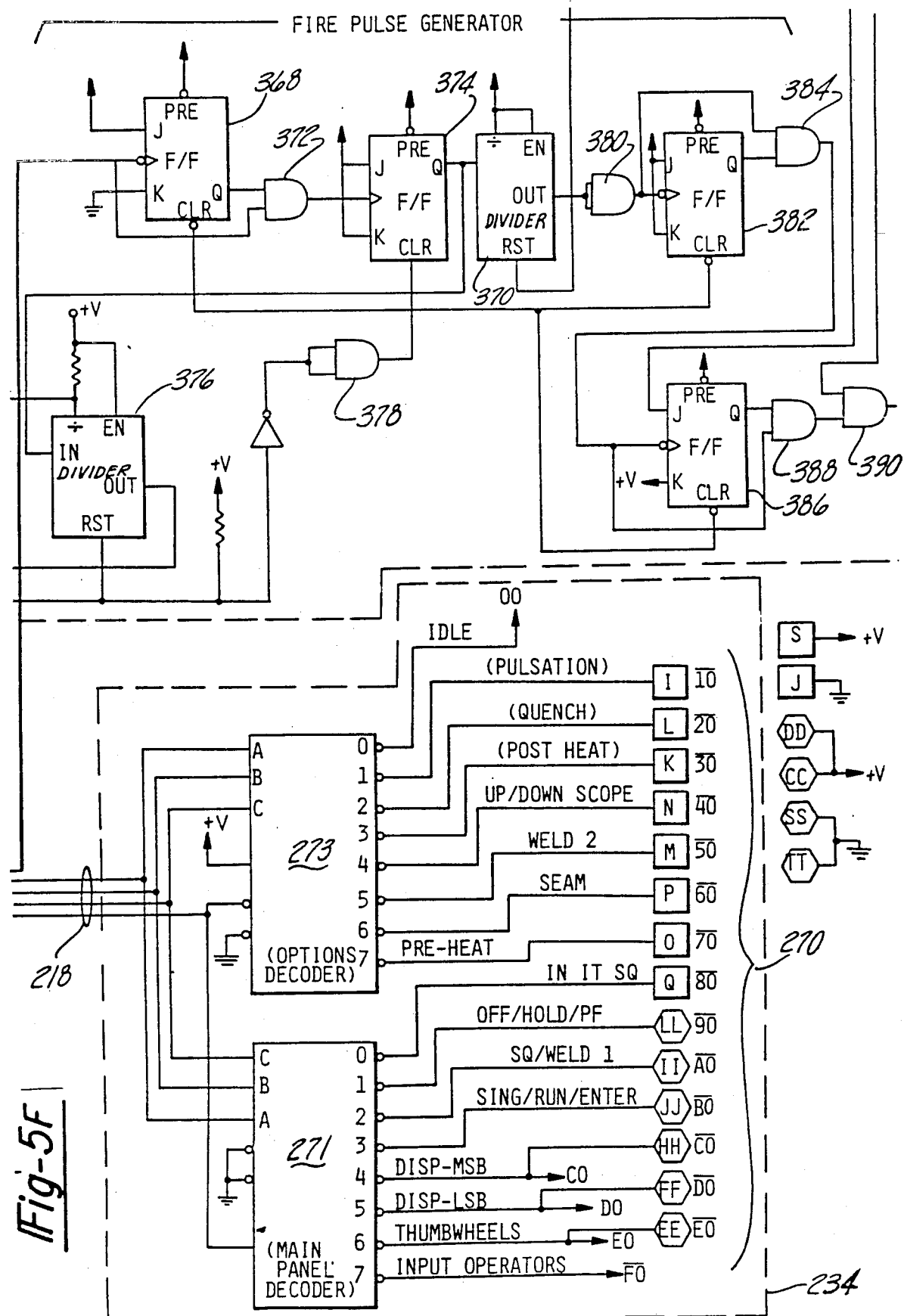

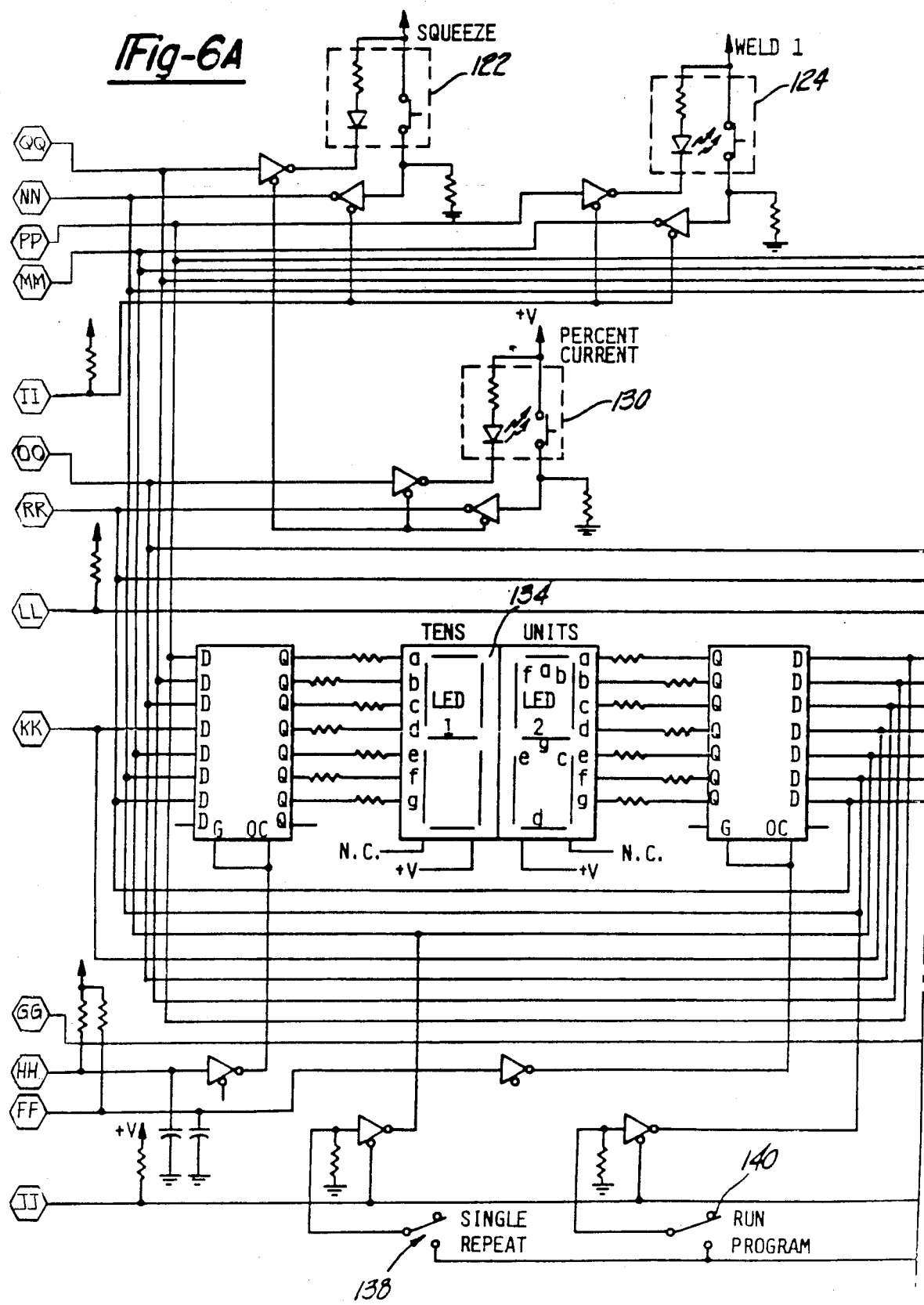

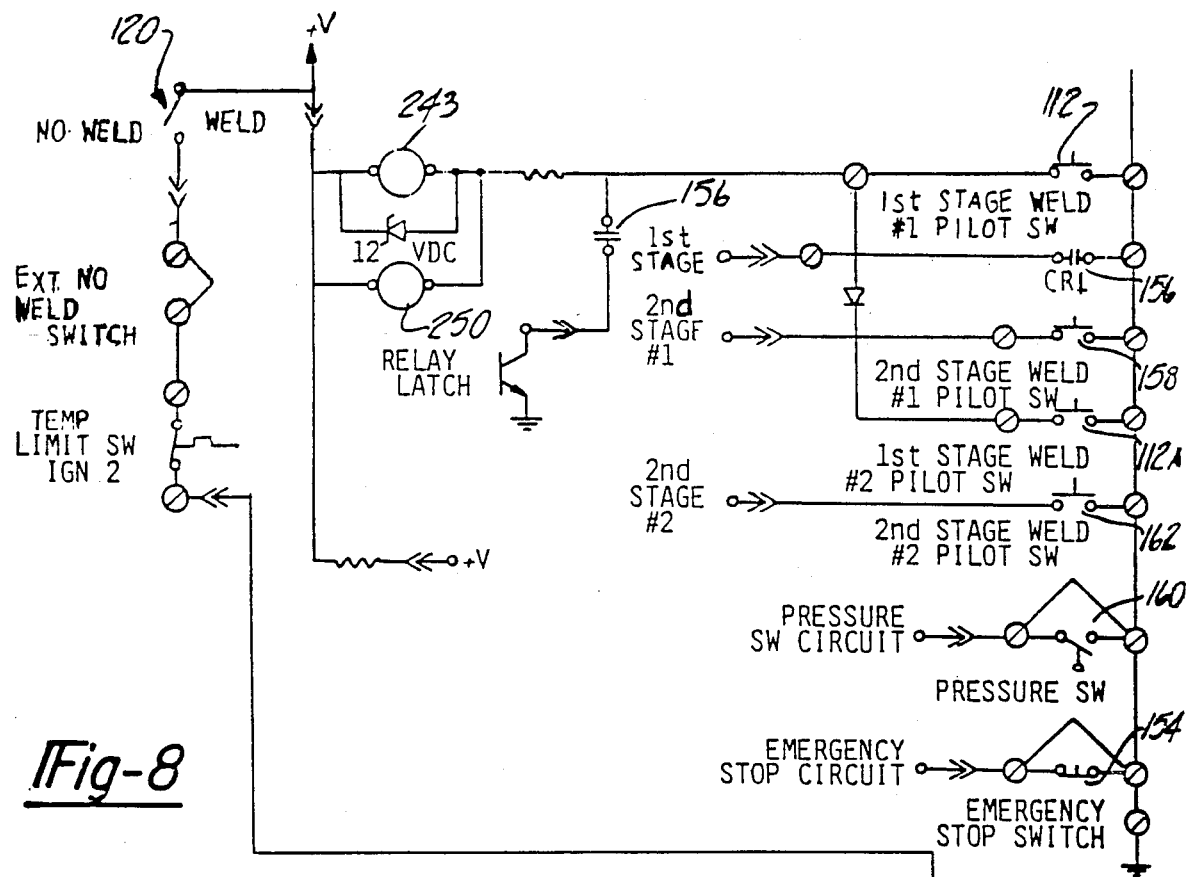
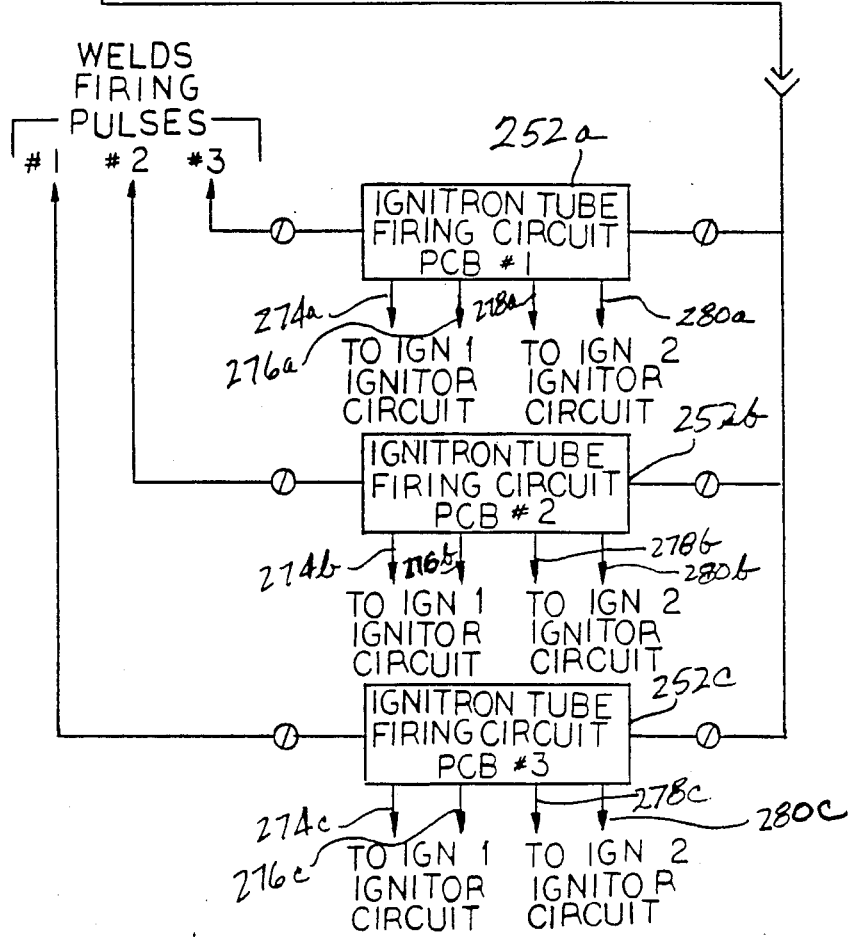
Fig-8

THREE PHASE HIGH FREQUENCY SPIKE WELDING SYSTEM

RELATED APPLICATIONS

This is a continuation-in-part of U.S. application Ser. No. 582,326 filed Feb. 22, 1984 now abandoned.

TECHNICAL FIELD

The present invention broadly relates to resistance-type welding apparatus and electrical power supplies therefor, and deals more particularly with a control system for sequentially controlling a plurality of welding operations in one or more welding cycles which includes a three phase power supply particularly suited for supplying a train of current pulses for the welding operations.

BACKGROUND ART

The process of resistance welding involves the positioning a workpiece to be welded between a pair of electrodes through which electrical current is delivered from a source thereof. The electrodes are clamped under pressure to squeeze the workpiece therebetween so that electrical current is delivered from one electrode through the workpiece to the other electrode at the point of contact between the electrodes and the workpiece. Heat generated by the resistance encounted by the current passing through the parts of the workpiece to be joined melts the contact faces of the part, thereby melting the parts to create a weld. In some cases, after the weld joint between the parts has reached a sufficiently high temperature, electrical current flow is terminated and the clamping pressure is maintained for a prescribed time interval to unite the parts. In other cases, such as spot welding, the parts need not remain clamped after current flow is terminated.

In order to adapt pulse power type welding apparatus for use in various applications, control systems have been devised which allow selective control of each sequence in a welding cycle, i.e., total clamping time, welding time, holding time, after termination of welding current, as well as the magnitude of current delivered to the electrodes. These prior art systems employed mechanical timers and potentiometers arranged in an analog circuit to control the various process variables. Systems of this type were undesirable, however, in that the process parameters could not be selected and controlled with the repeatable precision required in many applications.

In order to deliver additional current to the workpiece in some applications, a three phase AC power supply is employed to increase the frequency of welding pulses. The use of a three phase AC power supply substantially complicates the system for controlling the various process parameters.

Accordingly, it is a primary object of the present invention to provide a solid state control system employing a mircocomputer for accurately and reliably controlling a resistance-type pulse welding apparatus employing a three phase power supply.

A further object of the present invention is to provide welding apparatus and a control system therefor as described above which is highly flexible in terms of its adaptability to various welding applications.

A further object of the invention is to provide a control system as described above in which process parameters are precisely selected and stored in the memory for use in controlling the welding apparatus.

A still further object of the invention is to provide a control system as described above which includes a sensing circuit for protecting the level of line voltage and inhibiting the operation of the mircocomputer when the line voltage falls below a prescribed level thereof.

A further object of the invention is to provide a three phase power supply for a welding system as described above which substantially reduces the size and number of components for the circuit.

Another object of the invention is to provide a three phase power supply as described above which employs a welding transformer having three separate primary coils supplied by each phase of the power supply and connected to a common ground terminal.

These, and further objects of the invention will be made clear or will become apparent during the course of the following description of a preferred embodiment of the present invention.

BRIEF SUMMARY OF THE INVENTION

A resistance-type welder employs a three phase, pulsed power supply and a pair of opposed, spaced apart welding electrodes between which workpiece parts to be welded are clamped. At least one of the electrodes is mounted on an extensible motor member, such as a solenoid actuated hydraulic cylinder. A microcomputer based control system coupled with the power supply and solenoid is employed to allow precise, repeatable selection and control of process parameters such as clamping time, welding time, holding time and the magnitude of current delivered to the electrodes. The control means includes memory means for storing data corresponding to the selected process parameters and a central processor unit for controlling data flow and a pair of circuits which respectively operate the solenoid and power supply. Data corresponding to the variables is digitally input to the memory by a series of bistable switches and a thumb wheel switch. A plurality of manually actuatable switches coupled with the central processor are controlled by the operator to initiate one or more welding cycles. A sensing circuit is provided which detects the level of line voltage and inhibits the operation of the processor when the line voltage drops below a described level. One of the circuits controlled by the processor comprises a pulse oscillator which operates a solid state switch for controlling the solenoid, and the other circuit controlled by the processor includes a frequency divider and logic gate means for gating a divided frequency signal employed to control the three phase power supply.

BRIEF DESCRIPTION OF THE DRAWINGS

In the drawings:

FIGS. 3A, 3B and 3C, taken in combination, form a combined block and schematic diagram of the control system;

FIG. 4 is a detailed schematic diagram of a power supply employed in the control system shown in FIGS. 3A, 3B, and 3C;

FIGS. 5A–5F, taken together form a detailed schematic diagram of the control system shown in FIGS. 3A–3C;

FIGS. 5A–5F are to be arranged for proper viewing;

FIGS. 6A and 6B, taken in together, form a detailed schematic diagram of the data input and output devices associated with the control panel shown in FIG. 2;

FIGS. 7A, 7B, and FIG. 8 taken together form a detailed schematic diagram depicting the interconnection of the control system with the power supply and solenoid;

BEST MODE FOR CARRYING OUT THE INVENTION

Figure 1:
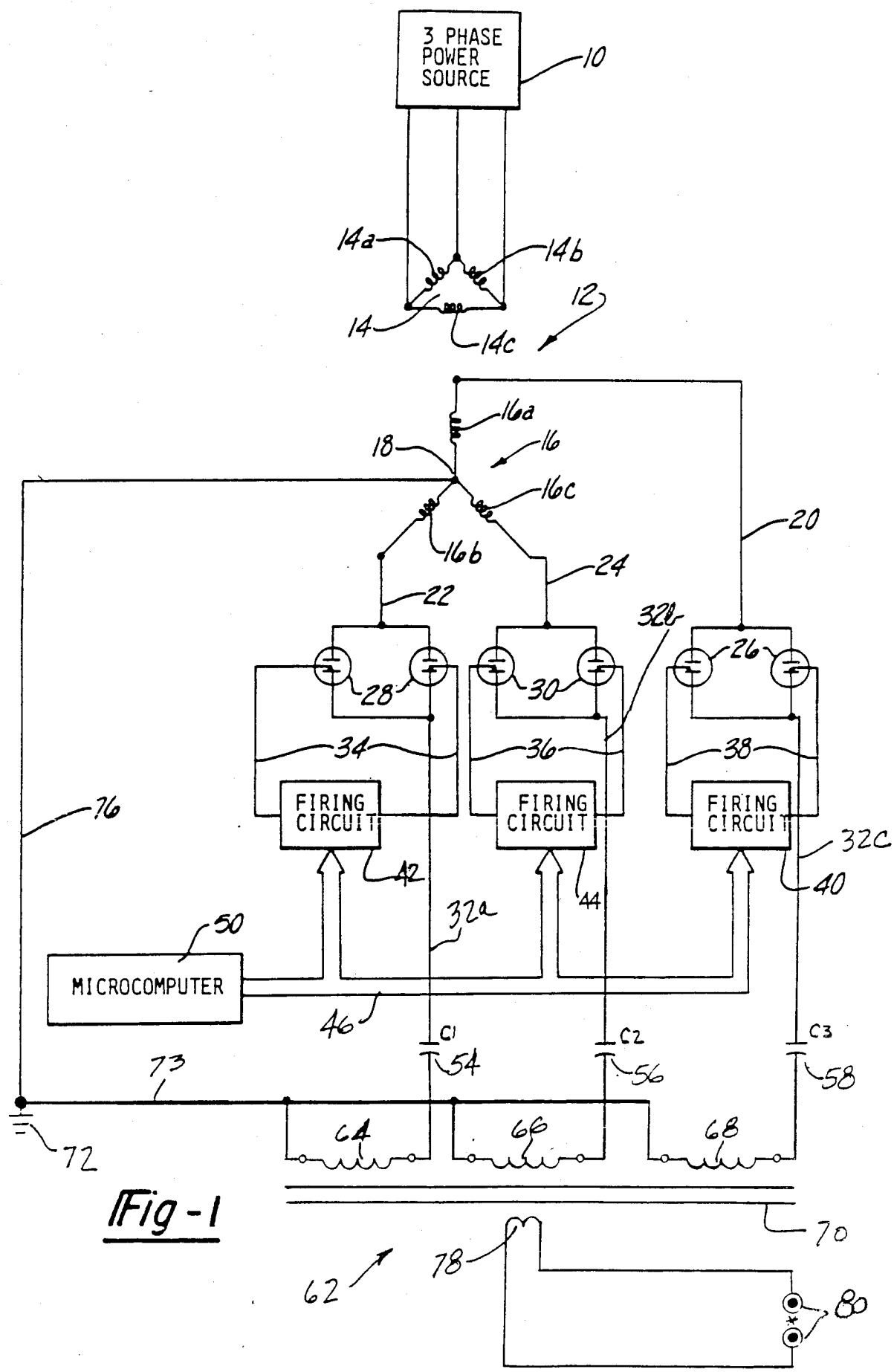
FIG. 1 is a combined block and schematic diagram of a welding apparatus and control system therefor employing a three phase power supply, which forms the preferred embodiment of the present invention.

Referring first to FIG. 1, the present invention broadly involves welding apparatus which includes a pulse generating, three phase power supply for producing high amplitude current pulses used in spike or pulse welding applications. The pulse generator is connected between a source of three phase AC power and a pair of welding electrodes 80 which deliver current pulses to a workpiece (not shown) to be welded. The pulse generator includes a delta-to-wye step down voltage transformer 12 which reduces the voltage from the three phase power source 10, from 460 to 220 volts, for example. The transformer includes a primary circuit comprising coils 14a, 14b, and 14c connected in delta relationship to the supply lines of the power source 10, as well as a wye secondary 16. The secondary 16 includes coils 16a, 16b, and 16c connected in wye relationship to a common or neutral terminal 18 which is connected by a common line 76 to ground 72. Each of the coils 16a, 16b, and 16c forms a portion of a pulse forming circuit comprising corresponding lines 20, 22, and 24. Lines 20–24 are connected in series with corresponding pairs of parallel connected ignitrons 26 30.

Figure 10:
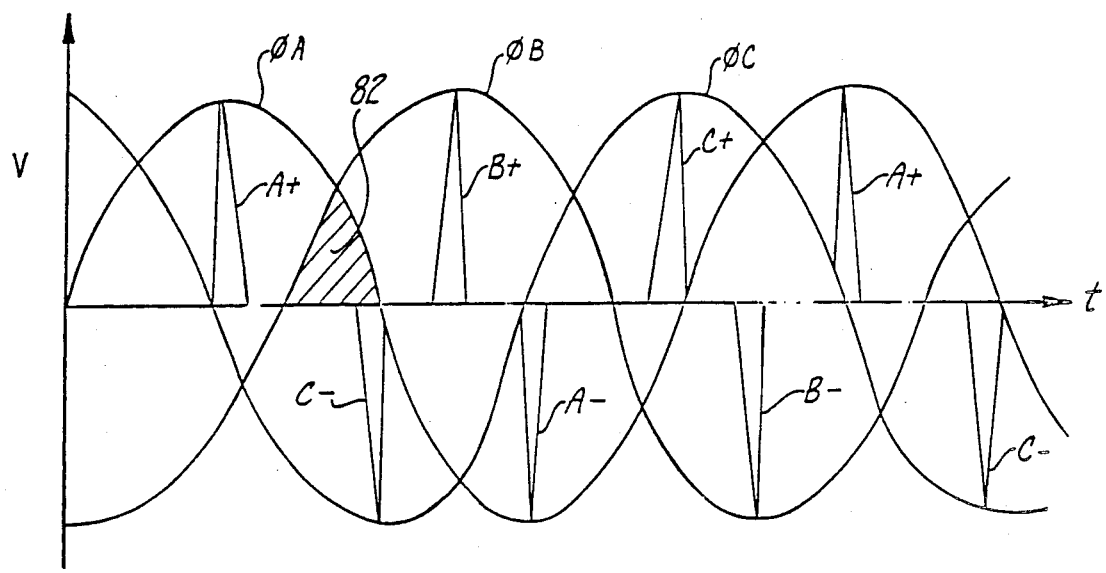
Figure 5G:
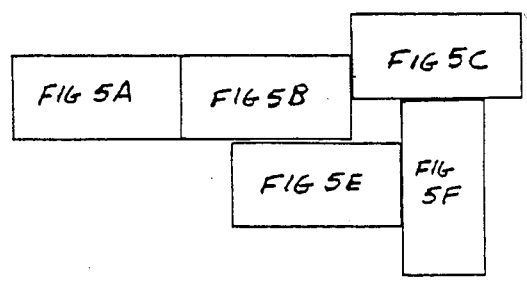
FIG. 5G is a plan view showing how

Each ignitron in each pair 26–30 thereof is fired during each half cycle of the corresponding phase derived from coils 16a, 16b, 16c. Referring also to FIG. 10, ignitrons 26 are respectively fired during the positive and negative half cycles of phase A derived from coil 16a. Similarly, ignitrons 28 are respectively fired during the positive and negative half cycles of phase B and ignitrons 30 are respectively fired during the positive and negative half cycles of phase C. The ignitrons 26–30 are controlled by corresponding firing circuits 40–44 which function to generate properly timed firing or timing pulses for firing ignitrons 26–30; the firing signals are alternately delivered on line 34–38. The firing circuits 40–44 are in turned controlled by a microcomputer 50, discussed later in more detail, which is programmed to control the firing circuits 40–44 in a manner to produce pulses of the desired duration.

The half wave outputs of ignitrons 26–30 are respectively delivered by lines 32a, 32b, 32c to respectively associated series circuits. For example, the series circuit for phase A connected with line 32a includes capacitor 54 and a coil winding 64 of a step down voltage transformer 62. The series circuit is completed by connection of the primary coil winding 64 to the ground 72 via a return line 73. Similarly, the series circuit for phase B includes the capacitor 56 and a second coil winding 66 of the step down transformer 62. Finally, the series circuit for phase C includes the capacitor 58 and the third primary coil winding 68 of the transformer 62. Thus, it may be appreciated that each of the primary coil windings 64, 66 and 68 is connected via the return line 73 to ground 72 and the neutral terminal 18 of the secondary of the transformer 12.

The half cycle signwaves output by each of the firing circuits are successively employed to charge and then discharge the corresponding capacitors 54, 56 and 58. As best seen in FIG. 10, the capacitors 54, 56 and 58 effectively reduce the width of the voltage half waves applied to the corresponding coil winding 64–68 so as to form voltage spikes A+, B+, C+, A−, B− and C−. In this manner, the voltage spikes applied to coils 64–68 do not overlap as would occur if the sinusoidal half waves (OAOBOC) from the firing circuits applied to coils 64–68. Any wave form overlap would effectively result in a short circuit condition between the phases, thus overloading and possibly burning out the transformer 12.

Figure 1A:
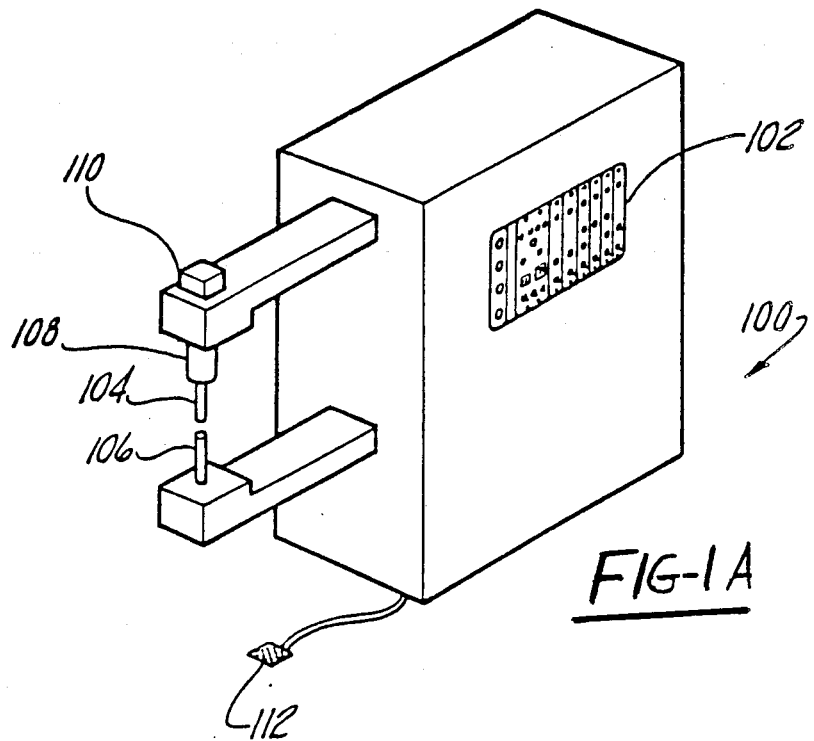
FIG. 1A is a perspective view of the welding apparatus and control system therefore.

The mechanical portions of the welding system, as well as the control system therefor, will now be discussed in greater detail, and in this connection reference is now made to FIG. 1A.

The welding apparatus generally indicated by the numeral 100 comprises a pair of spaced electrodes 104 and 106 of conductive material such as copper, between which parts of a workpiece (not shown) to be welded are clamped. One of the electrodes 106 is stationarily mounted while the other electrode 104 is mounted on the output shaft of a hydraulic cylinder 108. Cylinder 108 is operated by a solenoid actuated valve 110 which is controlled by a later-discussed control system. The control system includes a control panel 102 which allows selective input and read-out of process variables. A manually-actuatable switch 112 is also connected with the control system for initiating one or more welding cycles.

After the desired process variables have been entered into the control system via control panel 102, the workpiece parts are appropriately positioned in the gap between the electrodes 104 and 106. Switch 112 is then actuated, whereupon valve 110 is operated to cause hydraulic cylinder 108 to extend which in turn moves electrode 104 toward electrode 106 thus clamping and squeezing the parts therebetween. In some cases, the electrodes 104 and 106 will be clamped on the parts to be welded for a prescribed time interval prior to the delivery of electrical current through the parts.

For purposes of the present description, the following process variables and their corresponding definitions will be employed:

Squeeze time—the time interval between the initial application of electrode force on the parts and the first application of current. In the event that precompression of the parts is desired, squeeze time is the duration between the initial application of electrode force on the parts and the application of maximum force on the parts.

Weld Time—the duration during which welding current is delivered through the electrodes to the parts in making a weld.

Weld Cycle—the complete series of events involved in the making of a weld on the parts.

Hold time—in spot projection welding, hold time is the duration during which force is applied at the point of weld after the last impulse of current ceases. In seam, flash and upset welding, hold time is the duration during which force is applied to the parts after current flow ceases.

Off time—the duration during which electrodes are out of contact from the parts. This term is generally employed where repetitive weld cycles are used in making multiple welds on a single pair of parts.

Figure 2:
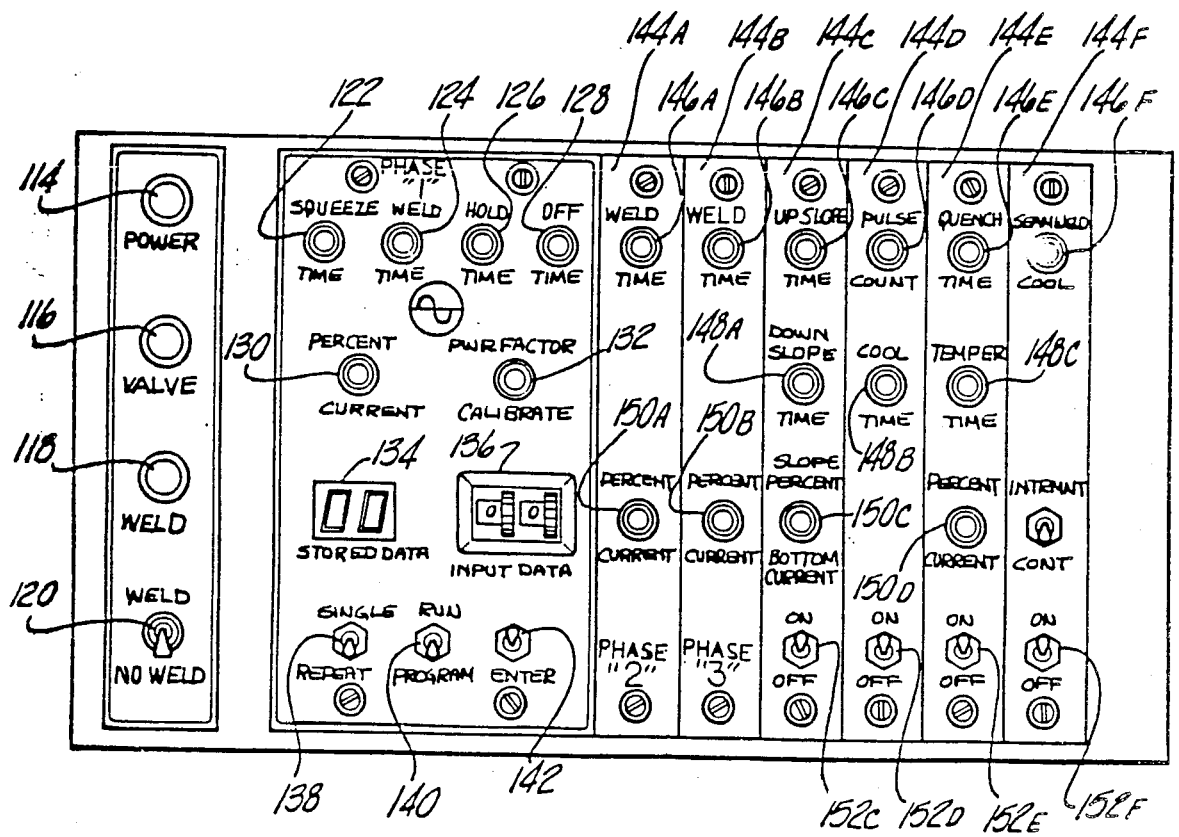
FIG. 2 is an elevational view of the control panel.

Referring now to FIG. 2, the control panel 102 allows data to be input to the control system and provides readout of process variables as well. A power lamp 114 provides a visual indication when the control system is energized and ready for use. A valve lamp 116 operably associated with the solenoid actuated valve 110, is illuminated when the valve 110 is actuated and remains illuminated for the entire duration of the squeeze, weld and hold times. A weld lamp 118 operatively associated with a later-discussed welding transformer provides an indication of whether the transformer is energized, and the brilliance of this lamp is controlled by the percent current selection switch 130.

A weld/no weld switch 120 is of a toggle variety and provides a means of initiating a control cycle without delivering current to the weld transformer. When switch 120 is set at weld, current is delivered to the welding transformer when the control sequence is initiated. A squeeze time switch 122 is of a push button variety and is self-illuminating when actuated to indicate that data may be entered into the control memory relating to squeeze timing. A weld 1 time switch 124 for phase "A" is also of a self-illuminating, push button type and enables data to be entered into the control memory relating to weld time. The push button, self-illuminating hold time switch 126 allows data to be entered into the control memory relating to hold time. Off time switch 128, is similar to switches 122-126, and allows data to be entered into the control memory relating to off time.

A percent current switch 130 for phase "A" is of push button, self-illuminating type and permits data to be entered into the control memory relating to the welding phase shift or percent current. A power factor calibrate switch 132 is similar in construction to switch 130 and permits data to be entered into memory relating to a power factor expressed in a percentage.

A two-digit LED type display output 134 provides readout from memory of both numerical data and designations to indicate both operator commands and control conditions during the course of the control sequence. Data may be input into the control system, in accordance with the sequential actuation of switches 122-132 by means of a thumbwheel-type, double decade switch 136. A single/repeat switch 138 is of a two position type and is provided to allow selection of either a single or repetitive mode of operation. With switch 138 in the single position, a later-discussed timer times through its entire cycle after initiation thereof. At the end of the hold time, the timer deactivates the welder whether or not the manually actuatable pilot switch 112 has been released. In the repeat position of switch 138, the timer sequences through all positions and automatically initiates the next sequence; off time allows time for the parts of the workpiece to be realigned before the next sequence begins. The control system continues to sequence the operations automatically as long as the pilot switch 112 remains actuated.

A two position type run program switch 140 allows the selection of either a programming or running mode of operation. With switch 140 in the run position, normal control initiation and sequencing may be initiated. However, memory data may not be entered or altered in the memory while the switch 140 is in the run mode. With the switch 140 in the program position, the control sequence is inhibited an memory data may be modified.

A momentary enter switch 142 is provided to allow entry of data into the control memory; once the thumbwheel switch 136 has been set to the desired position, actuation of the enter switch 142 causes the data set on thumbwheel switch 136 to be entered into the control memory.

In addition to the basic operating functions discussed above, a plurality of control modules 144 are provided.

Module 144A includes switches 146A and 150A which respectively control weld time and current for phase "B" and module 144B includes switches 146B and 150B which respectively control weld time and current for phase "C". The remaining modules provide optional control operations. An up/down slope control module 144C may be employed when a sloped current effect is required when making a weld; this module provides an auxiliary time immediately before the weld and a second auxiliary time immediately after the weld. A pulsation module 144D may be employed to supply multiple impulses of weld current for a predetermined count, with the cooling period between each current pulse.

A quench and temper control module 144E is provided to provide a post weld auxiliary current for tempering purposes, which is preceded by a cooling period for quenching purposes. Finally, a seam weld module 144F may be employed in welding applications where a continuous or intermittent seam weld is required; this module supplies an auxiliary heating time which may be intermittently or continuously employed.

The control modules 144A-144F are each provided with a self-illuminating type push button switch 146A-146F, as well as switches 148A-148C and 150A-150D to allow data input to the control memory in a manner similar to that described with reference to switches 122-132. A series of two position switches 152C-152F are respectively provided to energize the corresponding modules.

As will become apparent hereinafter, the control system of the present invention readily lends itself adaptable for use with numerous types of control modules employed in various specialized welding applications.

Figure 3B:
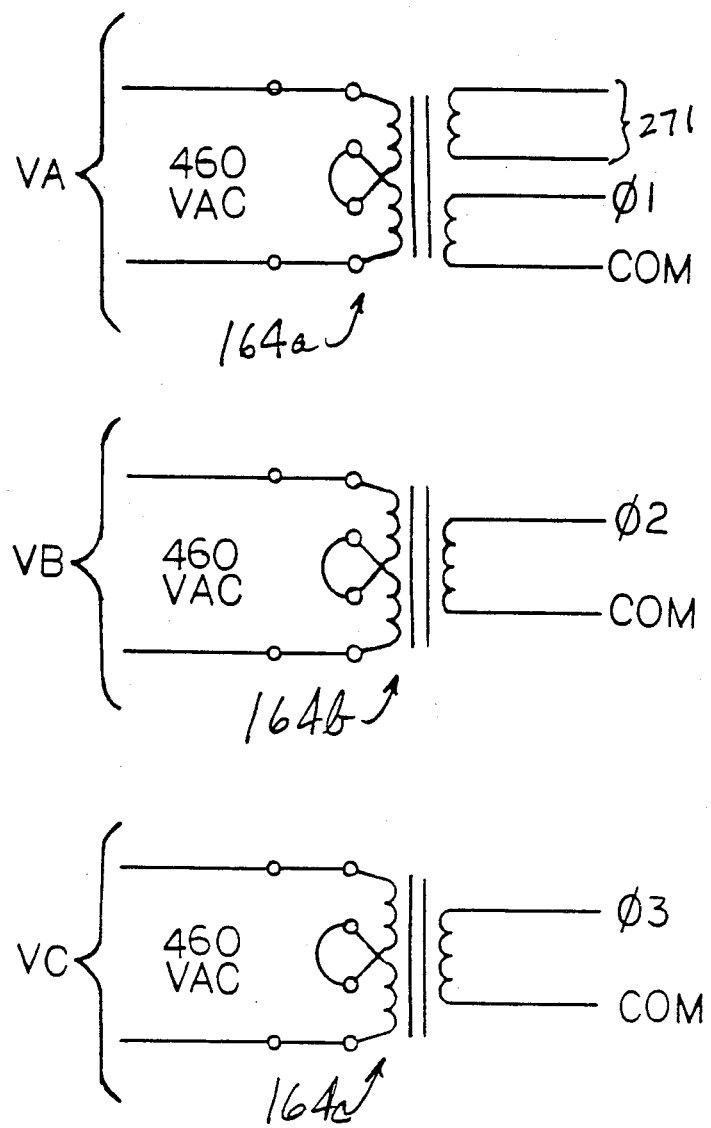
Figure 3C:
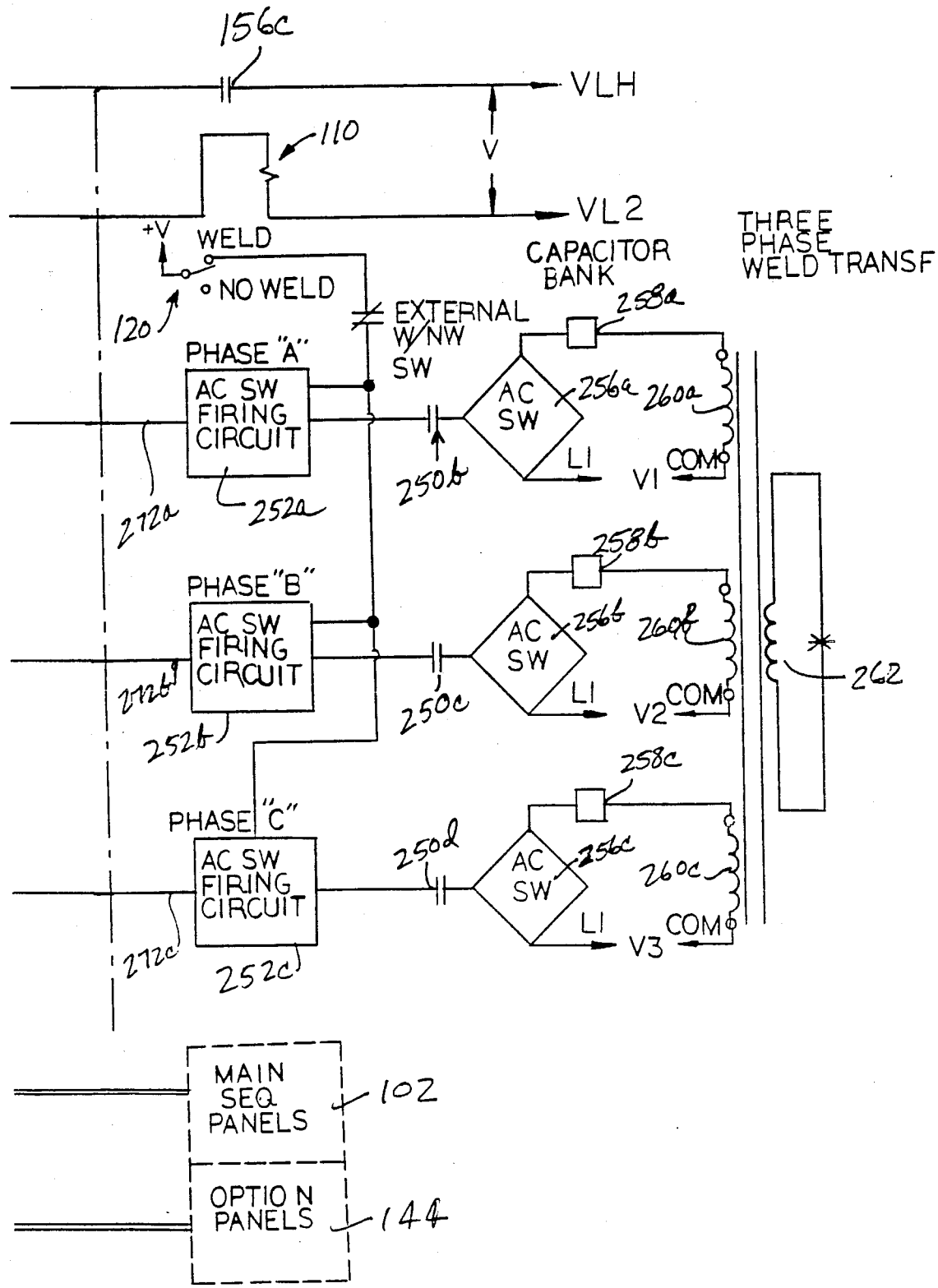
Figure 5A:
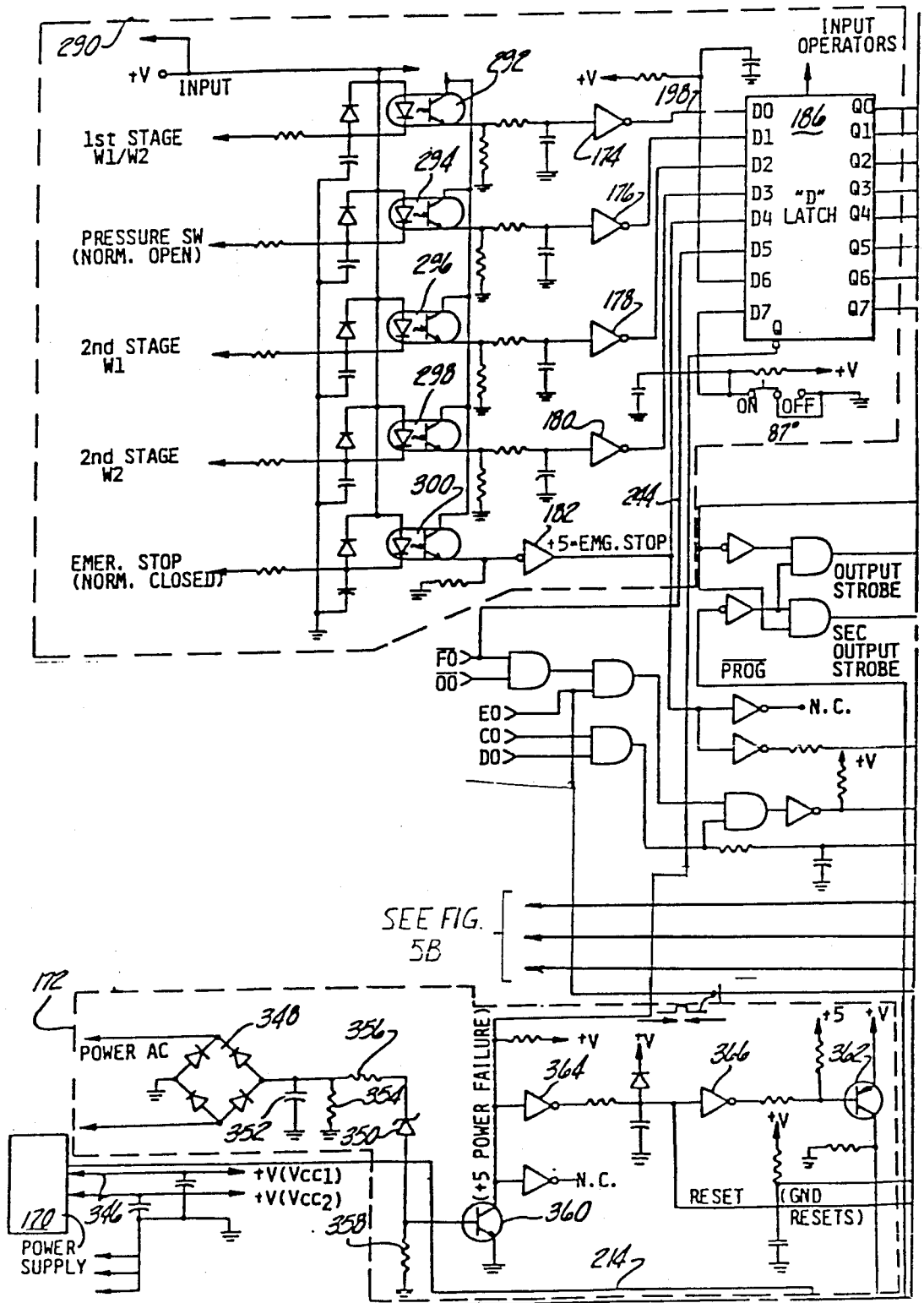
Figure 5B:
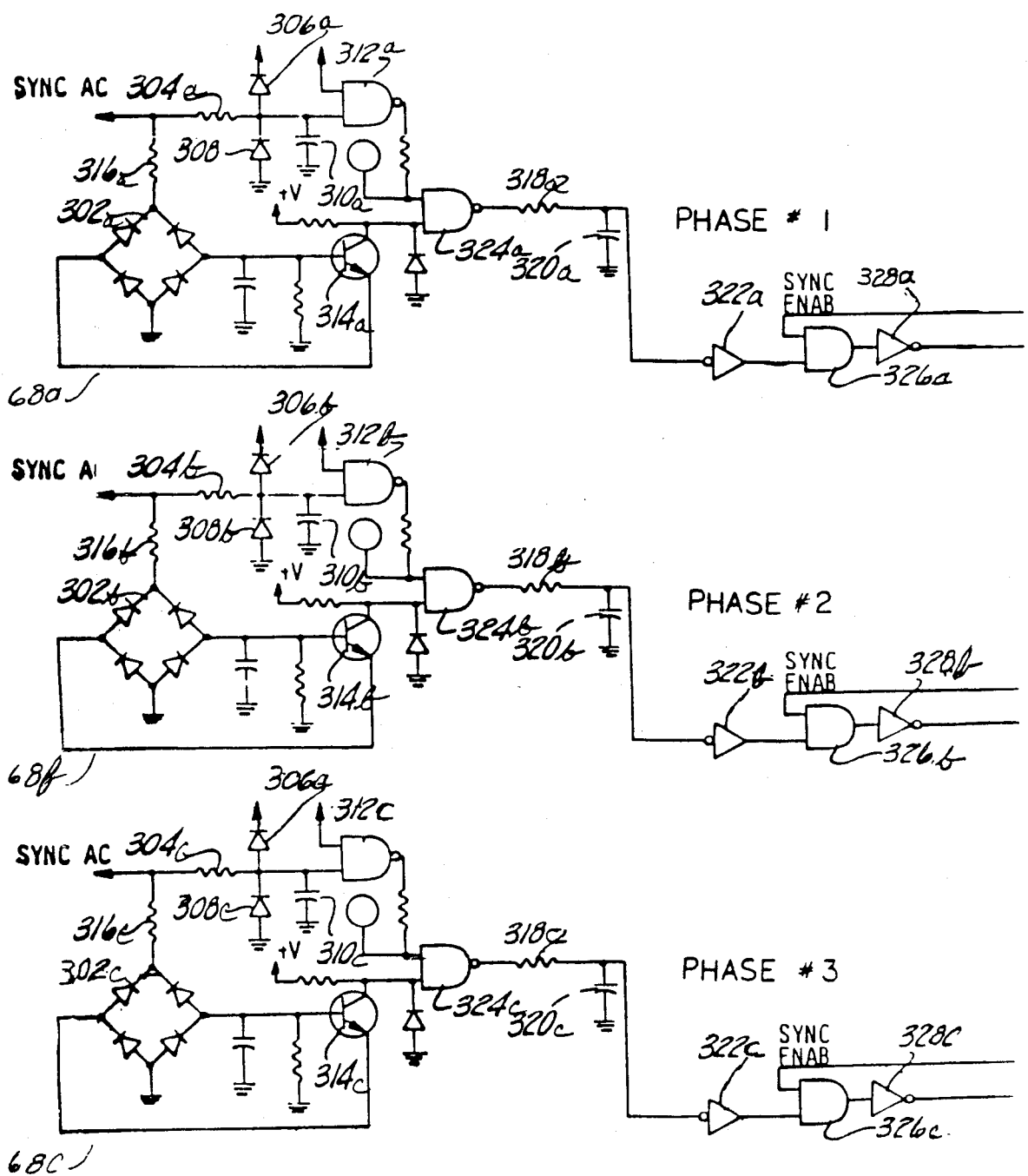
Figure 5E:
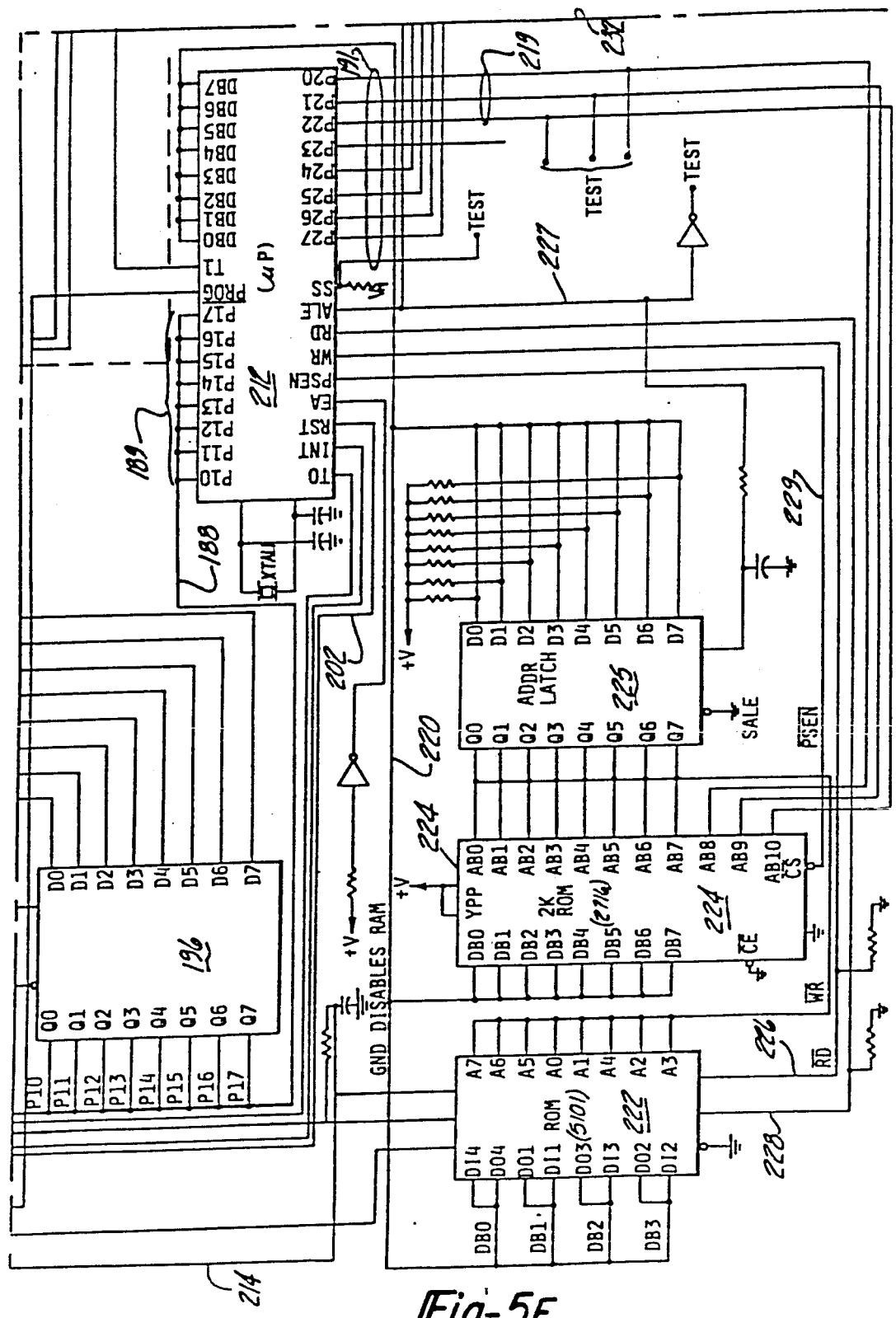

Referring now also to FIGS. 3A, 3B, and 3C, the control system includes an input section generally indicated within the broken line 290 which comprises a plurality of input switches 112, 154, 156A, 158, 160 and 162. As previously discussed, pilot switch 112 is manually actuated by the user. An emergency stop switch 154 is further provided either on the control panel 102, or elsewhere, to allow emergency deactivation of the welder. Switch 156A comprises relay contacts of a later-discussed relay 156. Second stage weld switches 158 and 162 may also be optionally provided in those applications where the welding sequence is of a two-stage variety. Switches 112, 154, 156A, 158, 160 and 162 are connected through corresponding inverters 174-182 to the inputs of a D-type latch 186. The output of inverter 174 is also coupled via line 198 to the disable input of a later-discussed output latch 190.

The parallel outputs of latch 186 are coupled via an 8-bit data bus 188 to the inputs of output latch 190, option latch 192, display latch 194, thumbwheel latch 196 and to the data input of a microprocessor 212. The parallel data output lines of latches 192-196 are coupled via an 8-bit data bus to a pair of later-discussed main sequence connectors 264 and option connectors 266.

Central processor 212 is of the conventional type and may include a read-only memory in which programmed instructions are stored for controlling the processor, however, in connection with the present invention, it has been found desirable to provide an independent read-only memory (ROM) 244 in which such programmed instructions are stored. The central processor 212 is connected to a RAM (random access memory) 222 and ROM 224 via data bus 220 over which data is transmitted and received. Data may be read from RAM 222 or written therein in accordance with the state of write line 226 and read line 228 which are controlled by processor 212. Data may be read from ROM 224 by control signals output from processor 212 on read line 228. ROM 224 is enabled by processor 212 via signals delivered on line 230. Control signals are delivered to and received from the central processor 212 on input/output data buses 188 and 218. Data bus 218 interconnects ROM 224, processor 212 and a later-discussed program decoder circuit 234. Processor 212 is adapted to provide output enabling signals on lines 204, 206, 208 and 210 to the corresponding latches 196, 194, 192 and 190.

A power failure detection circuit 172 is operably coupled with a source of power, such as transformers 164a, 164b, 164c and is operative to deliver output signals on line 202 and 244 to processor 212 and input latch 186, respectively, when the primary supply of power falls below a prescribed level. Three phase power derived from the transformers 164a, 164b, 164c is rectified by bridge 166 and delivered to a combined power supply regulator and battery 170. Power supply 170 provides a plurality of differing output voltages for use by various portions of the circuit. The battery associated with power supply 170 is operably coupled via line 214 to RAM 222 and is operable to maintain voltage on RAM 22 so as to prevent memory loss during a power failure. Synchronizing circuits 168 operably coupled with the secondaries of transformer 164a, 164b, 164c are also coupled via lines 216a, 216b, 216c to the processor and are operative to synchronize the processor 212 to the incoming line frequency for each phase.

One output of latch 190 is delivered via line 242 to a pair of relays 248 and 250 which are also controlled by pilot switch 112. Another output of latch 190 on line 240 operates a solenoid valve control circuit 236. The output of control circuit 236 is coupled in series with the main valve solenoid 110, a voltage source, and relay contacts 156C which are controlled by relay coil 156.

Three additional outputs of the latch 190, one of same being indicated at 238, are connected to the inputs of a weld fire pulse circuit 246. Weld fire pulse circuit 246 is also controlled by processor 212 via line 232. The outputs of weld fire pulse circuits 246 on lines 272 control firing of the welding transformer, the primaries of the welding transformer for each phase being indicated at 260a, 260b, 260c and the secondary thereof being indicated at 262. More particularly, the output of weld fire pulse circuit 246 actuates AC switch firing circuits 252a, 252b, 252c each of which may be selectively disabled by the previously-mentioned weld/no weld switch 120. The output of firing circuits 252a, 252b, 252c are delivered through relay contacts 250b, 250c, 250d to AC switches 256a, 256b, 256c. Switches 256a, 256b, 256c in turn, are respectively connected in series with a pair of firing capacitors generally indicated at 258a, 258b, 258c, the primary side of transformer 260 and a suitable source of voltage (V1, V2, V3), typically 230 volts.

The main sequence and option connectors 264 and 266, respectively, provide interconnection to the various lamps and switches on the control panel 102.

As shown in FIG. 4, the power supply 170 includes a full wave diode rectifier 166, filter capacitor 334, a pair of voltage regulators 336 and 338 and a battery backup circuit. The battery backup circuit allows the retention of logic memory in RAM 222 concerning timing and current information during those periods when the main control power is shut off. During normal control operation, the battery 340 is charged by voltage regulator 338. Regulator 338 also serves to supply some areas of the control circuit via line 214. Diode 342 blocks the battery voltage from attempting to power up any non-memory aspect of the logic assembly when the main control power is off. Voltage regulator 336 also supplies voltage to the various portions of the control logic via lines 346.

Processor 212 sends and receives information to RAM 222 and ROM 224 in accordance with a specific routine. Processor 212 first sends out a signal on data bus line 220 which is used to address logic memory. This address word is predetermined by the processor 212 and continuously changes throughout the control operation. The address word is locked into an address latch 225 upon delivery thereto of an address latch enable signal output by the microprocessor on line 227. Once latched, processor 212 clears its data bus 220 in preparation for the next operation.

The address signal latched in address latch 225 is also present on the address lines of RAM 222 and ROM 224. Processor 212 then selectively enables one of three lines. Specifically, an enabling signal delivered on line 229 results in the output of an 8-bit data word from an address location in ROM 224. An enabling signal output on line 228 results in the output of stored information from RAM 222 derived from control panel 102. When data is entered via control panel 102, the write input is enabled, thereby allowing information to be entered into RAM 222 for future use.

Latches 186, 190, 190A (which forms an integral part of latch 190) and 192-196 may each be of the D-type and are selectively enabled by processor 212 to receive information pertaining to external switch signals and to control output devices. As previously mentioned, latch 186 is operative to receive signals from the input operation circuit 290. Similarly, latches 192-196 have their data inputs connected via connectors 268 to the corresponding data outputs of the option modules 144A-144F, display 134 and thumbwheel switch 136.

The power fail and processor reset circuit 172 functions to alert processor 212 that a nonstandard operating conditions exists and that appropriate action must be taken. The power fail detect portion of the circuit comprises a diode bridge 348, diode 350, capacitor 352, resistors 354, 356 and 358, and transistor 360. In the event that the incoming line voltage derived from transformer 164 drops below a prescribed level, transistor 360 turns on thereby sending an inhibit signal through inverter 364 to the reset line 202 of processor 212. This inhibit signal is also delivered via line 244 to latch 186 and is employed by processor 212 to cause display 134 to indicate the designation of ES, as will be later discussed. Inhibit signal on line 244 inhibits all outputs of latch 186. In order to protect the sensitive RAM 222 during a power failure or reset condition, transistor 362 turns off thereby delivering an inhibit signal to RAM 222 via line 201; this protects RAM 222 from accidental loss of stored information.

As previously mentioned, data output from processor 212 on bus 218 is delivered to control panel 102 via a programmed decoder circuit 234. Decoder circuit 234 is operative to decode data output by processor 212 and selects an appropriate sequence position with respect to the various connections between the 16-bit data bus line 270 and the data bus connecting control panel 102 with connectors 264 and 266. Decoder circuit 234 comprises a pair of three to eight line decoders each having the inputs connected to lines 218 and eight output lines connected to corresponding switches or lamps on the control panel 102. As employed in the drawings, like interconnections between the output of decoder circuit 234 and the devices associated with control panel 102 are designated by the identical single or double letters. The coded multi-bit address output by processor 212 on lines 218 is converted by one of the decoders 271 or 273 to allow only one output position at any given time. Along with the function of enabling the devices associated with control panel 102, decoders 271 and 273 are operable to enable latch circuits which obtain information from the thumbwheel switch 136 and display information on display 134.

The fire pulse circuit 246 functions to generate the necessary weld fire pulses required to control firing of the welder. This circuit generates groups of fire pulses according to information derived from the processor 212. The address latch enable signal output from processor 212 on line 232 is delivered as a train of continuous pulses to the input of flip-flop 368. Flip-flops 368, 374, 382 and 386; AND gates 372, 380 and 384; and, divider 370 function to continually divide down the input signal so as to produce a weld fire pulse signal. Divider 376 whose output is coupled with the clear input of flip-flop 374 is also employed in the division process and functions to provide a specific divide rate depending upon the operating frequency of the system. Once processor 212 determines the operating frequency of the system, it delivers a signal on line 377 which causes divider 376 to select a particular divide rate. In the event that the operating frequency of the system is changed, the processor 212 in combination with divider 376 automatically make the necessary changes to correct the change in frequency. As previously mentioned, a main fire pulse enable signal is output from latch 190 on line 238 and is delivered to one input of AND gate 390, the other input thereto being formed from the output of AND gate 388. Thus, high signals present at both inputs of AND gate 390 result in a prefire pulse being delivered via line 391 to the input of a driver circuit 392 which comprises a Darlington transistor array employed to amplify the fire pulse signal. The amplified firing pulse is output from driver 392 on line 272. The output driver 392 is a standard device and is known in the industry as a ULN 2003. An additional output from output driver 392 on line 275 is employed to latch in a safety relay associated with the main valve solenoid 110.

The solenoid valve control circuit 236 receives an enabling signal from processor 212 on line 240 from latch 190 during the control signal. The signal on line 240 is inverted by inverted 241 and then actuates a fire pulse oscillator comprising NAND gates 396 and 398, resistors 400, 402 and 404, diode 406 and capacitor 408. The output of the oscillator is shaped and amplified by transistors 410 and delivered to the primary side of a pulse transformer 412. The secondary side of transformer 412 is connected to a bi-directional thyristor switch (triac) which is successively gated by the pulses passed from the primary to the secondary of transformer 412. A resistor 416 and capacitor 418 are provided as passive noise filters for protecting switch 414. The output of the solenoid valve control circuit 236 is delivered via line 286 and 288 to the main valve solenoid 110.

Figure 7A:
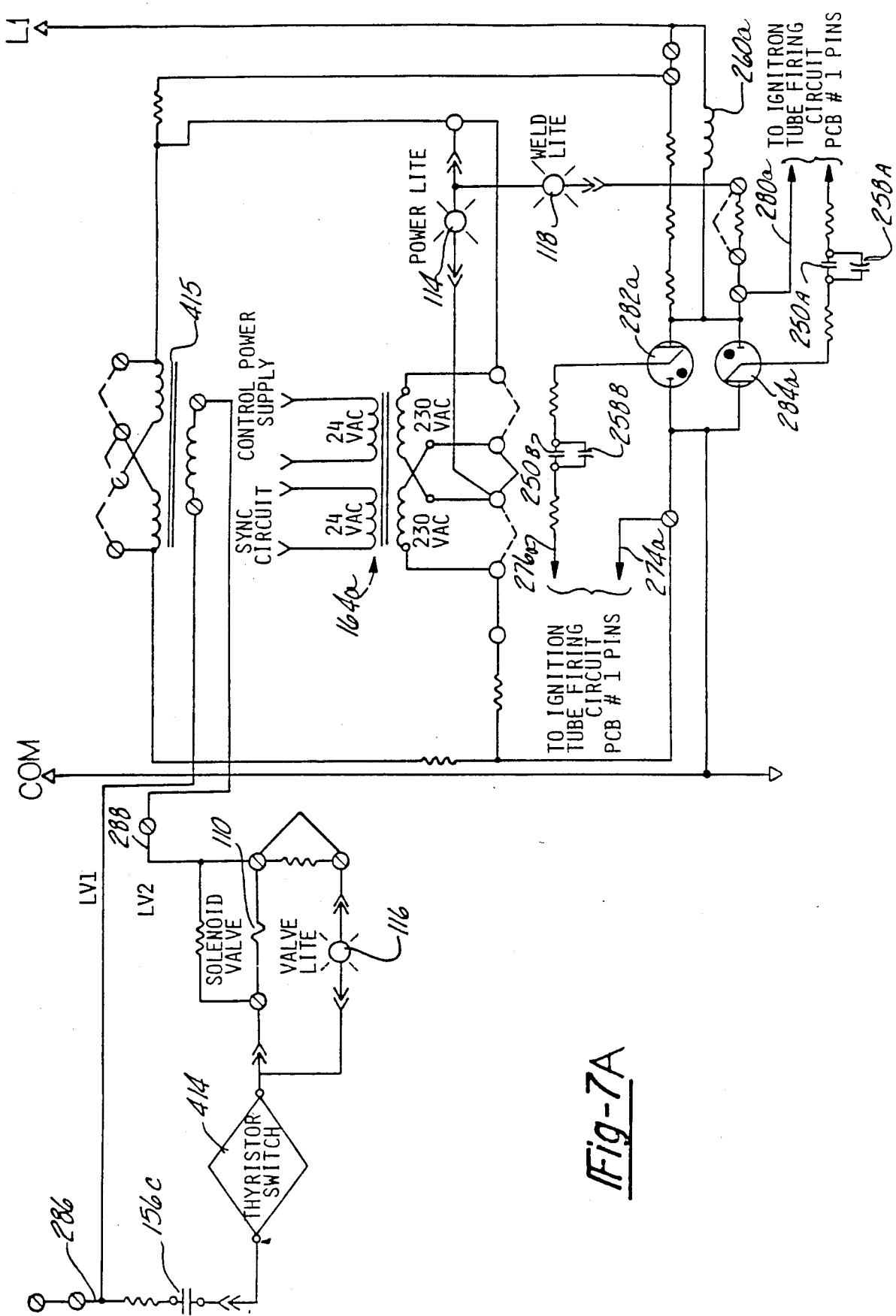
Figure 7B:
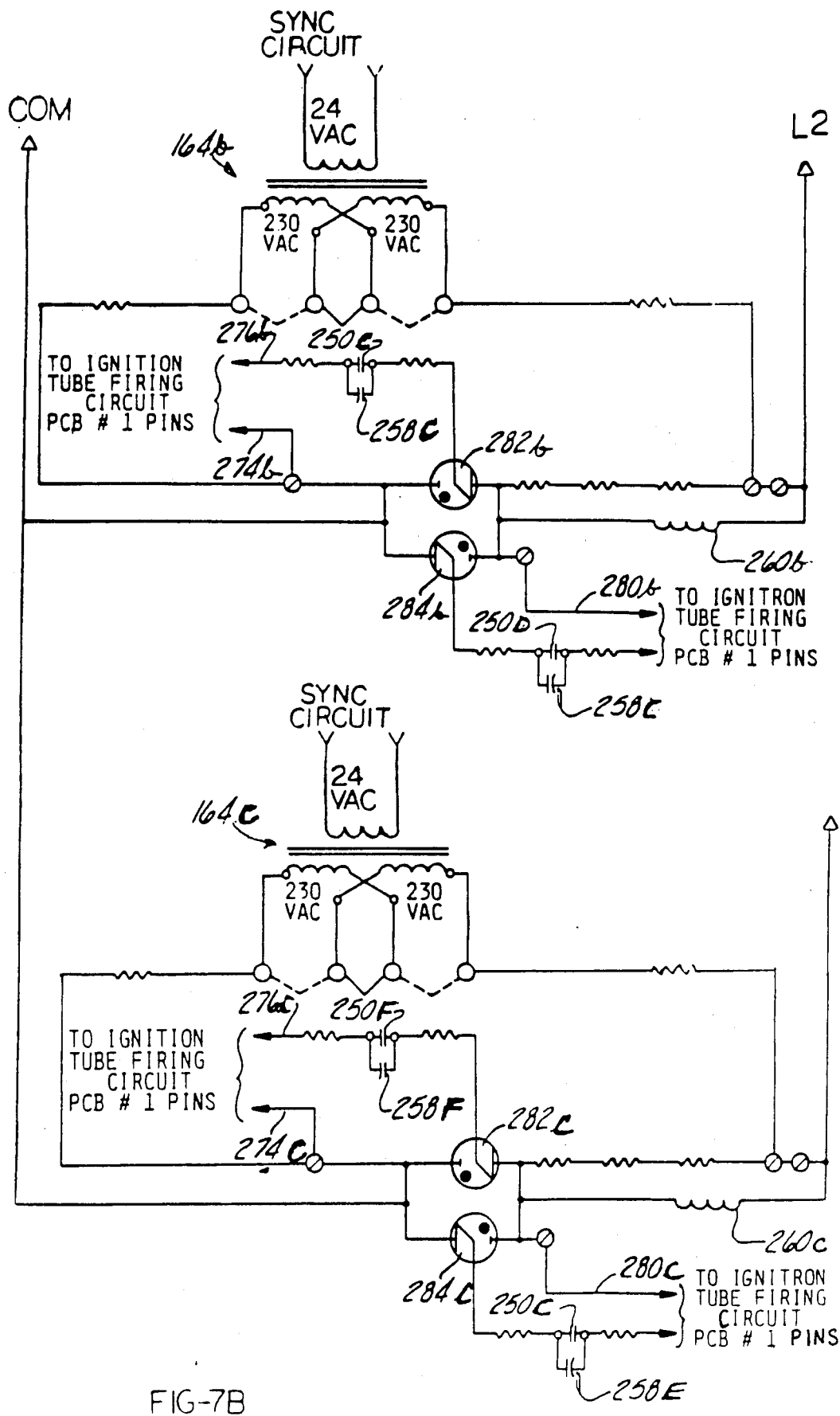

Reference is now made to FIGS. 7A, 7B and 8 which show the schematic interconnection between the primary side 260 of the welding transformer and the various portions of the circuit shown in FIGS. 5A–5F. As previously indicated, the solenoid valve control circuit 236 is operably coupled via lines 286 and 288 in series with the solenoid valve 110, thyristor switch 414 and relay contact 156C. Lines 286 and 288 are further coupled in series with the secondary of a power supply transformer 415. Upon closure of pilot switch 112, relay coil 248 (FIG. 3) is energized, thereby closing contact 156C and enabling the thyristor switch 414 to deliver enabling signals to valve 110. Valve light 116 is coupled in parallel with valve 110 and therefore is illuminated upon actuation of the valve 110.

Assuming now that the weld/no weld switch 120 is in the weld position, and that the pilot switch 112 is in the weld position, and that the pilot switch 112 has been actuated, fire pulse signals are delivered via line 272a, 272b, 272c to the AC switch firing circuits 252a, 252b, 252c which output firing signals on lines 274–280 for each phase of the circuit. The signals on lines 276 are delivered through relay contacts 250B, 250C, 250 F (which have been closed by relay coil 250) and thence to one input of the corresponding ignitron 282, a second input to ignitron 282 being formed by an associated line 274, (i.e., 274a, 274b, 274c). Similarly, lines 278 and 280 are connected in a series with the corresponding ignitron 284 through relay contacts 250A, 250D, 250E. Ignitrons 282 and 284 are coupled in series with the primary coils 260a, 260b, 260c of the welding transformer and the primary of power supply transformer 415.

Figure 6B:
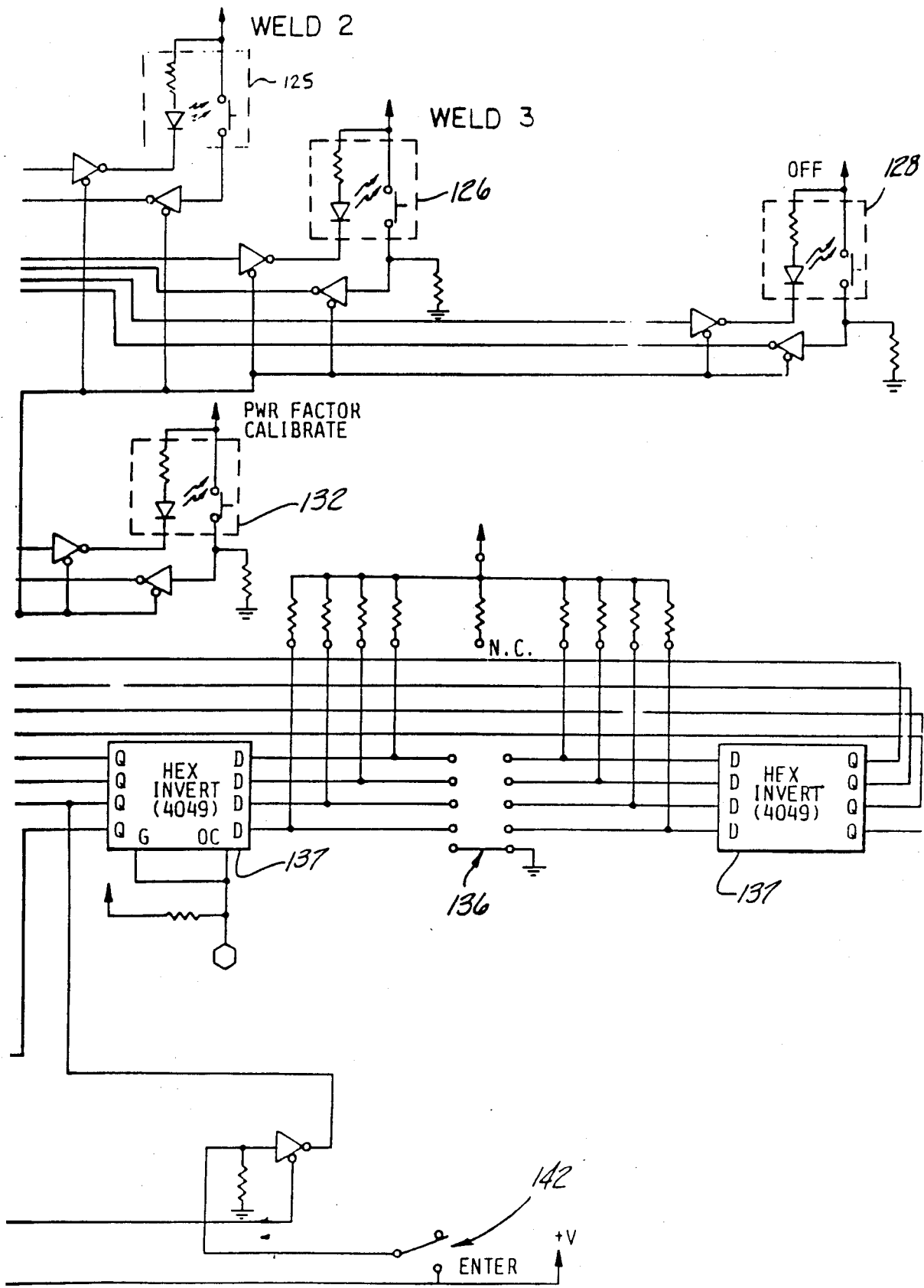

Turning now to FIGS. 6A and 6B, switches 122–132 are standard push button switches having LED type lamps coupled in circuit therewith. Switches 122–132 are interconnected with the programmed decoder 234 in accordance with the interconnection key shown in the drawings. Display 134 is of a two-digit LED type in which each digit is represented by seven LED segments. Display 134 is coupled via decoder/driver to the programmed decoder circuit 234 via interconnection 270. The thumbwheel switch 136 is coupled through a pair of hex inverters 137 to the display 134 and each of the switches 122–132. Switches 138–142 are of the single pole, double throw type and are likewise interconnected with the programmed decoder circuit 234 via interconnection 270.

Figure 9:
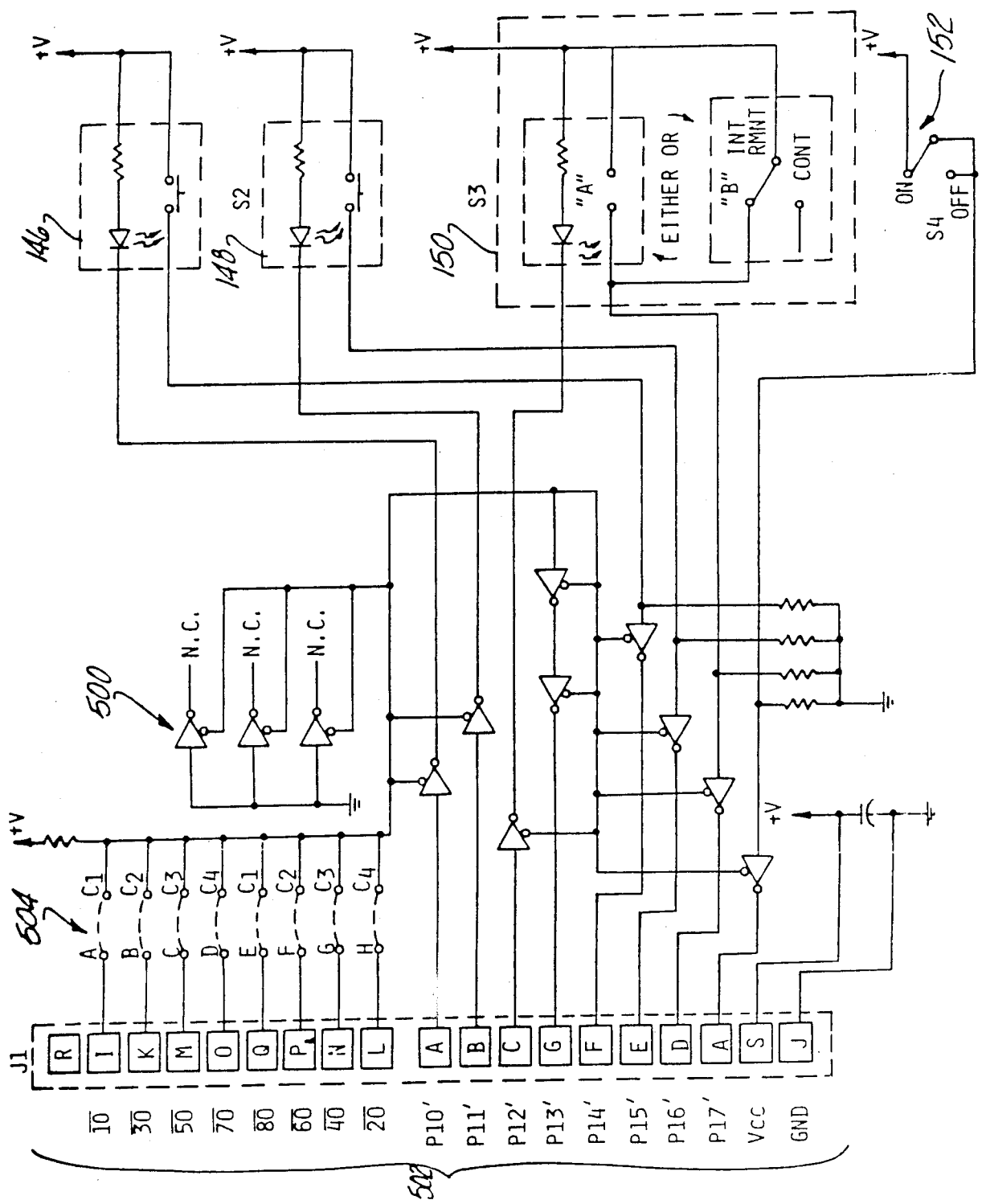
FIG. 9 is a detailed schematic diagram for a control module which may optionally be employed in connection with the control system of the present invention; and, FIG. 10 is a graph of the voltage waveforms generated by the three phase pulsed power supply.

Referring now to FIG. 9, which depicts a generalized schematic circuit for each of the optional modules 144A-144F, each module is basically provided with four switches, namely switches 146, 148, 150 and 152. Switches 146-152 are connected through a series of inverters 500 to a series of interconnections 502 adapted to be interconnected with the corresponding connection at 270 (FIGS. 5A-5E). A plurality of jumpers 504 are provided to allow switches 146-152 to be selectively coupled in circuit in accordance with the particular control module function.

It has been previously pointed out that the display 134 on control panel 102 provides a visual indication of the data entered into the control system memory. However, display 134 further displays alphabetic codes relating to the operating status of the control system in order to assist and inform the user. The display codes and their corresponding definitions employed in connection with the preferred form of the inventions are as follows:

C1—indicates a closure is required at the first stage initiation input.

C2—indicates a closure is required at the second state initiation input.

OC—indicates that the control sequence has terminated and all initiation switches must be open before the control can be reinitiated.

ES—indicates that the emergency stop input to the control is open. A closure of the emergency stop switch is required before the control can be reinitiated.

PS—indicates that the pressure switch input to the control is open. A closure of the pressure switch is required for the sequence to continue.

E1—indicates that the sloped bottom current is a greater value than the weld 1 current.

E2—indicates that the sloped bottom current is a greater value than the weld 2 current.

EE—indicates that data previously stored in the logic memory (i.e., timing or phase shift information) has been lost due to a low battery condition.

To initialize the control system for use, the run/program switch 140 is placed in the run position. At this point, the code of either C1 or OC will appear on the display 134. If OC is displayed, all initiation switches must be open before sequencing can take place. If C1 is displayed, a closure at the first stage (pilot switch 112) is required. Assuming that a single stage initiation is desired, upon closing of pilot switch 112, the code C1 disappears from display 134 and the control sequence is initiated. If, however, dual stage initiation is desired, upon closure of pilot switch 112, the code designation of C2 appears on display 134, the main solenoid valve 110 is energized and a control sequence is then delayed until a second stage closure switch (similar to pilot switch 112) is actuated. Once the second stage is actuated, the control sequence begins and the C2 designation on display 134 disappears. At the end of the control sequence, display 134 will provide an indication of OC; when the initiation switches (112, etc.) are open, C1 again appears on display 134, in preparation for another welding cycle. Switching of the single/repeat switch 138 to the repeat position causes the control system to sequentially initiate additional welding cycles automatically. In order to reprogram the control system for a new welding application, the run/program switch 140 is switched to the program position and data is entered into memory corresponding to the squeeze time, weld time, hold time, off time, percent current and power factor; this is accomplished by successively depressing the push button switches 122-132, selecting a particular parameter on the thumbwheel switch 136 and successively toggling the enter switch 142. After all data has been input to memory, the run/program switch is toggled to the run position.

From the foregoing, it is apparent that the welding apparatus and control system therefor as described above not only provide for the reliable accomplishment of the objects of the invention but do so in a particularly effective and reliable manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents there of fairly within the scope of the invention.

What is claimed is:

1. User-programmable electrical resistance welding apparatus of the type employing a three-phase alternating source of electrical power for producing pulses of electrical current and electrode means for delivering said current pulses to a workpiece to be welded, comprising:

three pulse-forming circuits respectively associated with the three phases of said alternating source of electrical power and each operative to produce a pulse of electrical current during any half cycle of the corresponding phase of said electrical power source, each of said pulse-forming circuits including a capacitor for converting each half cycle of electrical power of the corresponding phase into one of said electrical current pulses and an electrically controllable switch means for selectively connecting the corresponding phase of said power source with said capacitor;

control means for independently and selectively controlling the operation of each of said pulse-forming circuits such that the electrical current pulses delivered to said workpiece are produced by one or more of said pulse-forming circuits selected by said control means, the timing between electrical current pulses delivered to said workpliece being related to the identity of the one or more pulse-forming circuits selected by said control means, said control means including (1) three firing circuits for respectively controlling said electrically controllable switch means, (2) a memory for storing programmed data therein, (3) manually operable programming means for entering said data into said memory, said data representing user-selected phases of said electrical power source and user-selected timing between the electrical current pulses of the half cycles of the user-selected phases, (4) a processor connected with said memory and said firing circuits for controlling said firing circuits in accordance with said programmed data, whereby said pulse-forming circuits produce electrical current pulses having said user-selected timing using said user-selected phases;

a welding transformer coupled between said pulse-forming circuits and said electrode means for delivering said electrical current pulses from said pulse-forming circuits to said electrode means; and a three-phase transformer connected between said electrical power source and said pulse-forming circuits, said three-phase transformer including three secondary coil windings connected in a wye configuration having a common terminal, said coil windings being respectively connected with said pulse-forming circuits for delivering a corresponding phase of electrical power from said power source to the respective pulse-forming circuit, said common terminal being connected to ground such that each of said pulse-forming circuits are connected to said ground through the corresponding coil winding, whereby the electrical power applied to said welding transformer from said three-phase transformer through said pulse-forming circuits remains balanced when only certain of said pulse-forming circuits are selected to deliver said electrical current pulses to said welding transformer.

2. The welding apparatus of claim 1, wherein said welding transformer includes three primary coil windings respectively connected between said pulse-forming circuits and said ground.

3. The welding apparatus of claim 1, wherein said three-phase welding transformer includes three primary coil windings connected in a delta configuration.

* * * * *